United States Patent
Akashi et al.

(10) Patent No.: US 9,008,878 B2
(45) Date of Patent: Apr. 14, 2015

(54) CONTROL DEVICE FOR HYBRID VEHICLE INCLUDING EXHAUST-GAS DRIVEN GENERATOR AND METHOD OF CONTROLLING HYBRID VEHICLE INCLUDING EXHAUST-GAS DRIVEN GENERATOR

(71) Applicant: Mitsubishi Electric Corporation, Chiyoda-ku, Tokyo (JP)

(72) Inventors: Yohei Akashi, Chiyoda-ku (JP); Hideyuki Tanaka, Chiyoda-ku (JP); Hiroyuki Saito, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/921,659

(22) Filed: Jun. 19, 2013

(65) Prior Publication Data
US 2014/0172207 A1   Jun. 19, 2014

(30) Foreign Application Priority Data
Dec. 13, 2012   (JP) ................ 2012-271968

(51) Int. Cl.
*B60L 9/00*   (2006.01)
*B60W 20/00*   (2006.01)
(Continued)

(52) U.S. Cl.
CPC ............ *B60W 20/10* (2013.01); *B60W 10/06* (2013.01); *B60W 10/08* (2013.01); *B60W 10/26* (2013.01); *Y10S 903/93* (2013.01);
(Continued)

(58) Field of Classification Search
CPC ..... B60W 20/00; B60W 10/08; B60W 10/26; B60W 10/06
USPC ........................................... 701/22
See application file for complete search history.

(56) References Cited

U.S. PATENT DOCUMENTS

2005/0050887 A1 *   3/2005   Frank et al. ............ 60/597

FOREIGN PATENT DOCUMENTS

| JP | 2000-045817 A | 2/2000 |
|----|---------------|--------|
| JP | 2001-248491 A | 9/2001 |

(Continued)

OTHER PUBLICATIONS

Japanese Office Action (Preliminary Notice of Reasons for Rejection), Aug. 6, 2013, Patent Application No. 2012-271968.
Japanese Office Action (Preliminary Notice of Reasons for Rejection), Dec. 17, 2013, Patent Application No. 2012-271968.

*Primary Examiner* — Thomas G Black
*Assistant Examiner* — Luke Huynh
(74) *Attorney, Agent, or Firm* — Sughrue Mion, PLLC; Richard C. Turner (57) ABSTRACT

The control device for a hybrid vehicle including an exhaust-gas driven generator includes: a turbine (10); an exhaust-gas driven generator (11); a motor generator (16); a battery (14); and a control unit (12) for performing overall control based on a result of reading of a status signal. When the control unit determines based on the result of the reading of the status signal that an output of the internal combustion engine is required to be assisted by the motor generator, the control unit further determines whether a power generation by the exhaust-gas driven generator is in an inhibited state or an allowed state. When the control unit determines that the power generation by the exhaust-gas driven generator is in the inhibited state, the control unit stops the power generation by the exhaust-gas driven generator to drive the motor generator by the power from the battery.

9 Claims, 5 Drawing Sheets

(51) Int. Cl.
*B60W 10/06* (2006.01)
*B60W 10/08* (2006.01)
*B60W 10/26* (2006.01)
*B60K 6/48* (2007.10)

(52) U.S. Cl.
CPC ..... *Y02T 10/6295* (2013.01); *B60K 2006/4825* (2013.01); *B60W 2510/0638* (2013.01); *B60W 2520/10* (2013.01); *B60W 2540/10* (2013.01)

(56) References Cited

FOREIGN PATENT DOCUMENTS

| JP | 2008-274797 A | 11/2008 |
| JP | 2009-126303 A | 6/2009 |
| JP | 2010-144584 A | 7/2010 |

\* cited by examiner

CONTROL DEVICE FOR HYBRID VEHICLE INCLUDING EXHAUST-GAS DRIVEN GENERATOR AND METHOD OF CONTROLLING HYBRID VEHICLE INCLUDING EXHAUST-GAS DRIVEN GENERATOR

BACKGROUND OF THE INVENTION

1. Field of the Invention

The present invention relates to a control of a hybrid vehicle including an exhaust-gas driven generator, a motor generator, and a battery, in particular, a control device for a hybrid vehicle including an exhaust-gas driven generator and a method of controlling a hybrid vehicle including an exhaust-gas driven generator, which are configured to control the exhaust-gas driven generator and the motor generator while monitoring a power storage state of the battery when an acceleration request is issued.

2. Description of the Related Art

A hybrid vehicle includes a motor generator in addition to an internal combustion engine (hereinafter also referred to simply as "engine") as a driving source of a vehicle for the purpose of reducing fuel consumption of an automobile. In the hybrid vehicle described above, it is common to use regenerative power of the motor generator, which is generated during deceleration of the vehicle, as power for driving the motor generator. In recent years, however, the regenerative power generated during deceleration is not sufficient as the power for driving the motor generator under the effect of a higher output of the motor generator, which is obtained by increasing a voltage of the motor generator. As a result, there is a problem in that fuel efficiency is lowered due to an operation of the engine for power generation by the motor generator.

The internal combustion engine discards exhaust-gas energy after combustion. Therefore, there is proposed the following hybrid vehicle including an exhaust-gas driven generator (see Japanese Patent Application Laid-open Nos. 2008-274797 and 2009-126303). Specifically, the exhaust-gas energy is recovered as electric energy by the exhaust-gas driven generator driven by a turbine provided in an exhaust-gas passage, and is supplied to the motor generator. In this manner, low fuel consumption can be realized.

Japanese Patent Application Laid-open No. 2008-274797 proposes the following hybrid vehicle. In the hybrid vehicle including the exhaust-gas driven generator, the motor generator is operated by exhaust-gas power generation. Operations of the engine, the motor generator, and the exhaust-gas driven generator are controlled so that fuel consumption for a total output of the engine and the motor generator becomes the smallest during the operation of the motor generator.

Moreover, Japanese Patent Application Laid-open No. 2009-126303 proposes the following hybrid vehicle. In the hybrid vehicle including the exhaust-gas driven generator, the motor generator is driven by power from a battery without the exhaust-gas power generation because of insufficient exhaust-gas energy in an early phase of acceleration of the vehicle. After the vehicle is accelerated to a certain speed and a level of the exhaust-gas energy rises sufficiently, the motor generator is driven by power generated by the exhaust-gas power generation.

However, the related art has the following problems.

In Japanese Patent Application Laid-open No. 2008-274797, the minimization of the fuel consumption is taken into consideration. Therefore, the power is generated by the exhaust-gas power generation even when the vehicle is accelerated. As a result, the output of the engine is disadvantageously lowered. Thus, there is a problem in that an acceleration requested by a driver cannot be obtained. Moreover, a power storage state of the battery is not taken into consideration in the case of the exhaust-gas power generation. Therefore, there is another problem in that the battery cannot be maintained in an optimal charged state.

In Japanese Patent Application Laid-open No. 2009-126303, the power is generated by the exhaust-gas power generation in the early phase of the acceleration of the vehicle in consideration of the presence/absence of the exhaust-gas energy. Therefore, even when the energy of the exhaust gas is obtained, the output is disadvantageously lowered by a pumping loss of the engine due to an increased pressure of the exhaust gas resulting from the exhaust-gas power generation. As a result, there arises a problem in that the acceleration requested by the driver cannot be obtained or a combustion temperature in the engine is increased by the increased pressure of the exhaust gas to cause a trouble such as knocking and pre-ignition in the engine.

SUMMARY OF THE INVENTION

The present invention has been made to solve the problems described above, and has an object to provide a control device for a hybrid vehicle including an exhaust-gas driven generator and a method of controlling a hybrid vehicle including an exhaust-gas driven generator, which can simultaneously realize an acceleration requested by a driver while preventing the occurrence of an abnormality in an engine and realize a high fuel efficiency to achieve high drivability and efficiency.

According to an exemplary embodiment of the present invention, there is provided a control device for a hybrid vehicle including an exhaust-gas driven generator, the hybrid vehicle including: a turbine provided in an exhaust passage of an internal combustion engine; an exhaust-gas driven generator for generating power by being driven by the turbine; a motor generator for one of assisting an output of the internal combustion engine and generating power by using the output of the internal combustion engine; a battery for storing the power generated by the exhaust-gas driven generator and the power generated by the motor generator; and a control unit for reading at least one of an operation amount of an accelerator pedal, a vehicle speed, and an engine rpm as a status signal to perform overall control on the exhaust-gas driven generator, the motor generator, and the battery based on a result of reading of the status signal, in which: when determining based on the result of the reading of the status signal that the output of the internal combustion engine is required to be assisted by the motor generator, the control unit further determines whether the power generation by the exhaust-gas driven generator is in an inhibited state or an allowed state; and when determining that the power generation by the exhaust-gas driven generator is in the inhibited state, the control unit stops the power generation by the exhaust-gas driven generator to drive the motor generator by the power from the battery.

According to another exemplary embodiment of the present invention, there is provided a method of controlling a hybrid vehicle including an exhaust-gas driven generator, the hybrid vehicle including: a turbine provided in an exhaust passage of an internal combustion engine; an exhaust-gas driven generator for generating power by being driven by the turbine; a motor generator for one of assisting an output of the internal combustion engine and generating power by using the output of the internal combustion engine; a battery for storing the power generated by the exhaust-gas driven generator and the power generated by the motor generator; and a control unit for reading at least one of an operation amount of an accelerator pedal, a vehicle speed, and an engine rpm as a status signal to perform overall control on the exhaust-gas driven generator, the motor generator, and the battery based on a result of the reading of the status signal, the control method including: a first step of determining whether or not to assist the output of the internal combustion engine by the motor generator based on a result of the reading of the status signal; a second step of determining whether power generation by the exhaust-gas driven generator is in an inhibited state or an allowed state when the control unit determines that the output of the internal combustion engine is required to be assisted by the motor generator in the first step; and a third step of stopping the power generation by the exhaust-gas driven generator and driving the motor generator by the power from the battery when the control unit determines that the power generation by the exhaust-gas driven generator is in the inhibited state in the second step.

According to the present invention, when a requested driving force by a driver is large, control is performed to inhibit the exhaust-gas power generation and to generate power by the exhaust-gas power generation after an engine rpm increases a certain level so that the exhaust-gas power generation is not affected by a pressure drop. In this manner, there can be provided the control device for a hybrid vehicle including an exhaust-gas driven generator and the method of controlling a hybrid vehicle including an exhaust-gas driven generator, which simultaneously realize an acceleration requested by the driver while preventing the occurrence of an abnormality in the engine and realize a high fuel efficiency to achieve both high drivability and efficiency.

DETAILED DESCRIPTION OF THE PREFERRED EMBODIMENT

In the following, a control device for a hybrid vehicle including an exhaust-gas driven generator and a method of controlling a hybrid vehicle including an exhaust-gas driven generator according to an exemplary embodiment of the present invention are described referring to the drawings.

First Embodiment

Figure 1:
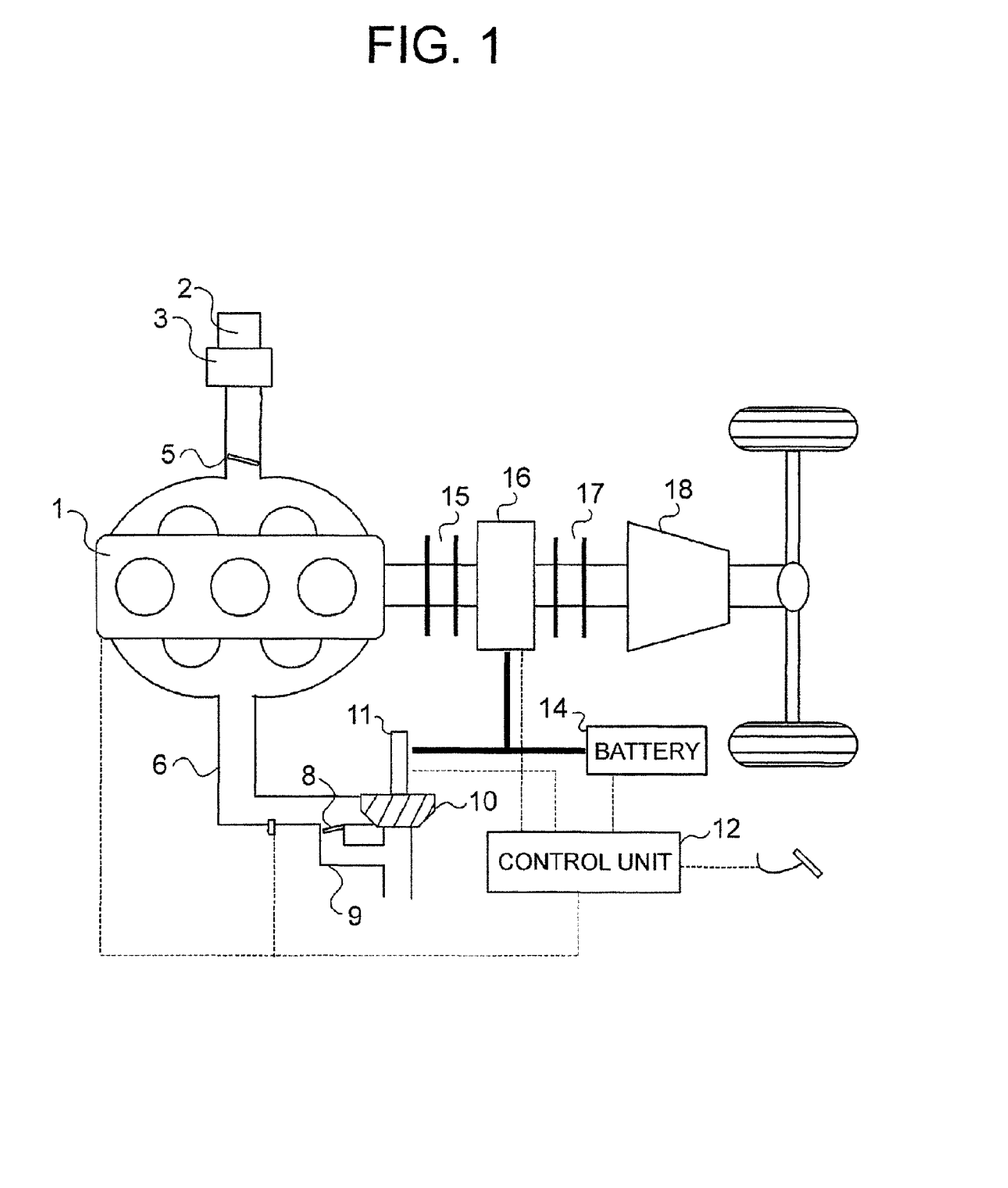
FIG. 1 is a diagram illustrating an overall configuration of a control device for a hybrid vehicle including an exhaust-gas driven generator according to a first embodiment of the present invention.

FIG. 1 is a schematic configuration diagram illustrating an overall configuration of a control device for a hybrid vehicle including an exhaust-gas driven generator according to a first exemplary embodiment of the present invention.

An internal combustion engine (hereinafter also referred to simply as "engine") 1 described in the first embodiment is a multi-cylinder engine. In FIG. 1, the engine 1 is illustrated as a three-cylinder engine. However, the present invention does not particularly limit the number of cylinders of the engine. Moreover, although the engine 1 is illustrated as a naturally aspirated engine in FIG. 1, the engine 1 may be a supercharged engine including a supercharger.

Further, the present invention is applicable not only to a direct-injection engine which injects a fuel into a cylinder but also to a port-injection engine which injects the fuel into an intake passage provided as a stage subsequent to a throttle valve 5.

In the engine 1, external air passes through an intake-air passage 2. After dust or the like is removed from the air through an air cleaner 3, the air is taken into cylinders through the throttle valve 5. An intake pressure of the air to be taken into the cylinders can be changed by an opening degree of the throttle valve 5. Based on the intake pressure, an output of the engine 1 is determined.

In the case of the direct-injection engine, the intake air is mixed with a fuel such as gasoline in the cylinders. The air/fuel mixture is combusted by ignition with a plug. In the case of a diesel engine, the air/fuel mixture is combusted by compression self-ignition. A high-temperature gas generated after the combustion in the cylinders is exhausted as an exhaust gas. The exhaust gas passes through an exhaust passage 6 to drive a turbine 10 and is then released to an atmosphere.

In a region where an exhaust-gas driven generator 11 is not required to be driven, the exhaust-gas driven generator 11 becomes a flow-path resistance to the exhausted air. Therefore, by opening a waste gate 8, the exhaust gas is released into the atmosphere through a bypass passage 9.

The exhaust-gas driven generator 11, which is provided coaxially with a turbine shaft, generates electric power by power of the turbine 10 which is rotated by the exhaust gas. A command for a power-generation torque of the exhaust-gas driven generator 11 is input from a control unit 12. Power-generation energy generated by exhaust-gas power generation is supplied to a motor generator 16 or stored in a battery 14.

The motor generator 16 can be driven not only by power energy generated by the exhaust-gas power generation but also by the power from the battery 14. Conversely, regenerative power from the motor generator 16 can be stored in the battery 14. The above-mentioned operations are performed based on a command from the control unit 12.

The engine 1 is connected to the motor generator 16 which assists the output of the engine 1 through an intermediation of a first clutch 15. A sum output obtained by adding the output of the engine 1 and an output of the motor generator 16 is transmitted to a transmission 18 through a second clutch 17 to drive tires.

The motor generator 16 has three modes. Specifically, the three modes are a driving mode for assisting the output of the engine 1, a power-generation mode for generating power by using the output of the engine 1, and a mode for driving the tires only by the driving of a motor when the first clutch 15 is disengaged.

When the motor generator 16 operates in the mode for driving a vehicle only by the driving of the motor, the first clutch 15 is disengaged and the motor generator 16 is driven by the power from the battery 14. This operation is selected based on a power storage amount in the battery 14 and a running state of the vehicle, and the detailed description thereof is herein omitted.

Figure 2:
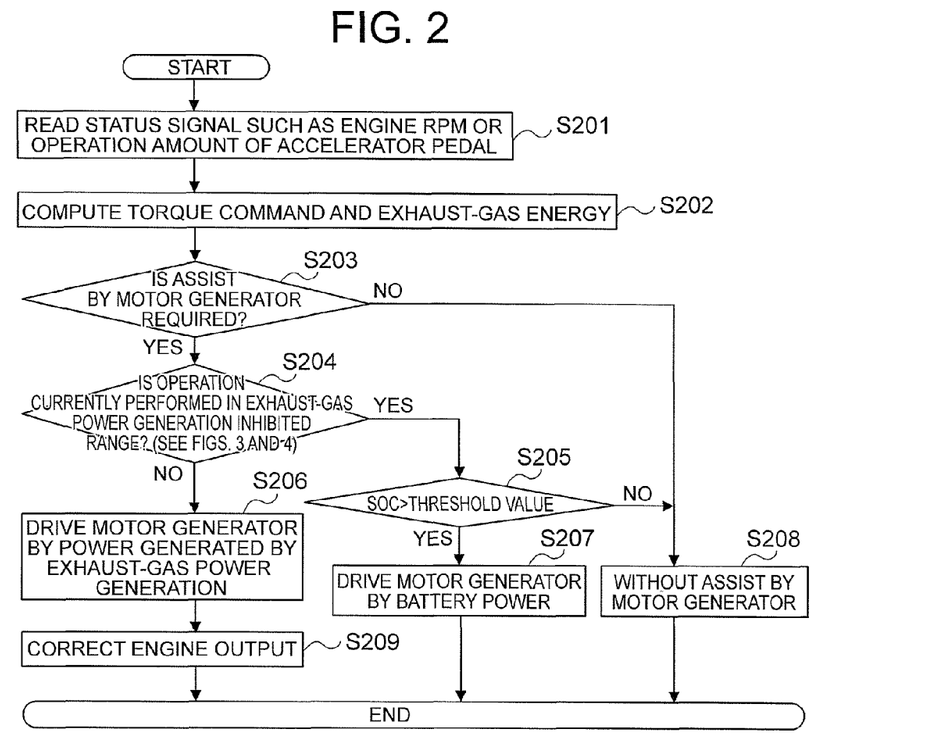
FIG. 2 is a flowchart illustrating a processing series performed in the control device for a hybrid vehicle including an exhaust-gas driven generator according to the first embodiment of the present invention.

Next, a specific control operation performed by the control device for a hybrid vehicle including an exhaust-gas driven generator according to the first embodiment, which has the configuration illustrated in FIG. 1, is described referring to a flowchart. FIG. 2 is a flowchart illustrating a processing series performed in the control device for a hybrid vehicle including an exhaust-gas driven generator according to the first embodiment of the present invention. It is supposed that the control unit 12 repeatedly performs the operation illustrated in the flowchart of FIG. 2 in predetermined computation cycles.

The processing series illustrated in FIG. 2 includes Steps S201 to S209 between the start and the end. First, in Step S201, the control unit 12 reads a vehicle speed of the vehicle, an operation amount of an accelerator pedal by the driver, and an engine rpm as status signals to be stored in a storage section. Next, in Step S202, the control unit 12 computes a torque command based on the operation amount of the accelerator pedal and the vehicle speed and then computes exhaust-gas energy based on the engine rpm and the torque command value.

Figure 3:
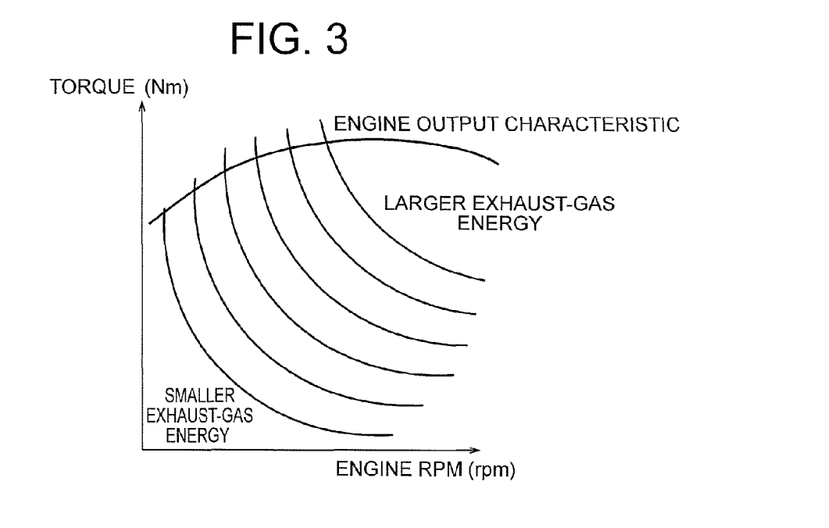
FIG. 3 is an explanatory graph showing the relationship between an engine rpm, a torque, and exhaust-gas energy in an operation of the control device for a hybrid vehicle including an exhaust-gas driven generator according to the first embodiment of the present invention.

The exhaust-gas energy can be determined by an exhaust-gas energy map which is obtained in advance based on the relationship between the engine rpm and an engine torque. FIG. 3 is an explanatory graph showing the relationship between the engine rpm, the torque, and the exhaust-gas energy in the operation of the control device including a hybrid vehicle including an exhaust-gas driven generator according to the first embodiment of the present invention. The exhaust-gas energy is obtained based on the engine rpm, the engine torque, and a rate of an exhaust-gas loss. Therefore, assuming that the exhaust-gas loss is substantially constant, the exhaust-gas energy has a linear relationship with respect to the engine output as shown in FIG. 3.

In Step S203, the control unit 12 determines, based on the torque command, the vehicle speed, and the engine rpm, whether or not an assist by the motor generator 16 is required. When the control unit 12 determines that the assist by the motor generator 16 is not required, the processing proceeds to Step S208 in which the vehicle is controlled to run only by the engine without the assist by the motor generator. Then, the processing series is terminated.

Figure 4:
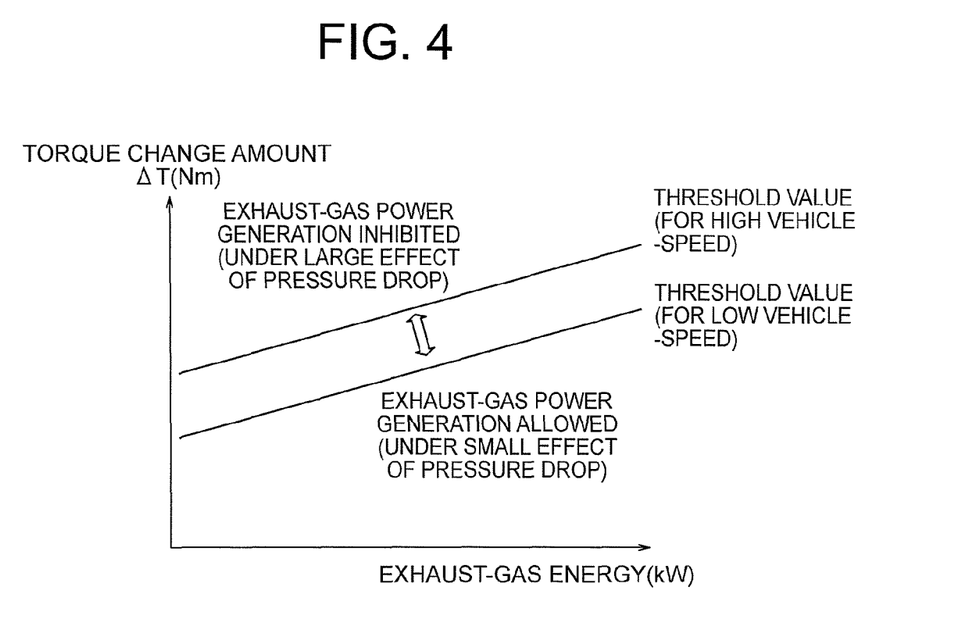
FIG. 4 is an explanatory graph showing the relationship between the exhaust-gas energy, a torque change amount, and inhibition of exhaust-gas power generation under the effect of a pressure drop in the operation of the control device for a hybrid vehicle including an exhaust-gas driven generator according to the first embodiment of the present invention.

On the other hand, when the control unit 12 determines that the assist by the motor generator 16 is required in Step S203 described above, the processing proceeds to Step S204 in which the control unit 12 determines whether or not the operation is currently performed in an exhaust-gas power generation inhibited range. FIG. 4 is an explanatory graph showing the relationship between the exhaust-gas energy, a torque change amount, and inhibition of the exhaust-gas power generation under the effect of a pressure drop in the operation of the control device for a hybrid vehicle including an exhaust-gas driven generator according to the first embodiment of the present invention.

Figure 5:
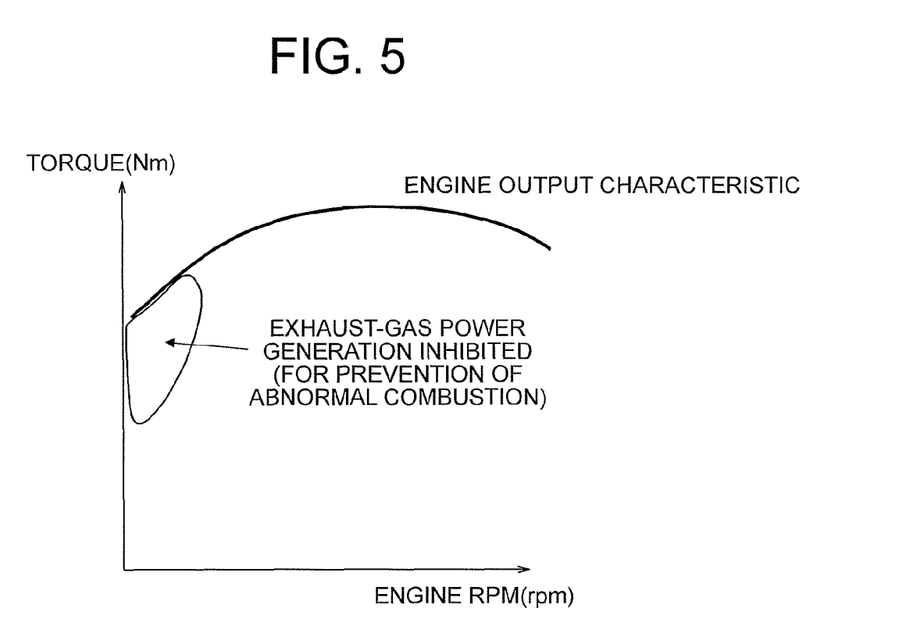
FIG. 5 is an explanatory graph showing the relationship between the engine rpm, the torque, and inhibition of the exhaust-gas power generation due to an abnormal combustion in the operation of the control device for a hybrid vehicle including an exhaust-gas driven generator according to the first embodiment of the present invention.

FIG. 5 is an explanatory graph showing the relationship between the engine rpm, the torque, and the inhibition of the exhaust-gas power generation due to an abnormal combustion in the operation of the control device for a hybrid vehicle including an exhaust-gas driven generator according to the first embodiment of the present invention. Whether or not to inhibit the exhaust-gas power generation is determined in accordance with FIGS. 4 and 5. Whether or not to inhibit the exhaust-gas power generation can be determined by using one or both of FIGS. 4 and 5.

FIG. 4 shows the concept that the exhaust-gas power generation is inhibited when the output of the engine is lowered under the effect of an exhaust pressure generated by the exhaust-gas power generation. Basically, when a change value ΔT in the torque command is large, the pressure drop of the engine 1 becomes larger if the power for driving the motor generator 16 is supplied by the exhaust-gas power generation. As a result, a desired assist cannot be provided.

Of the same torque change amount ΔT, when the exhaust-gas energy is large, the pressure drop of the engine 1 does not become large because of a large exhaust-gas flow rate even if the power for driving the motor generator 16 is supplied by the exhaust-gas power generation. As a result, the power can be generated by the exhaust-gas power generation. Moreover, the reason why threshold values for defining an exhaust-gas power generation allowed range and the exhaust-gas power generation inhibited range change depending on the vehicle speed as shown in FIG. 4 is because an inertia of the vehicle becomes large when a gearshift lever is in a high-gear position and there is no problem even if the engine output is lowered by a small pressure drop.

FIG. 5 shows the concept that the exhaust-gas power generation is inhibited when an abnormality occurs in the combustion inside the cylinders of the engine under the effect of the exhaust pressure generated by the exhaust-gas power generation. Basically, an abnormal combustion is likely to occur in a region where the engine rpm is low and the torque is high. Thus, the control unit 12 may determine whether or not to generate power by the exhaust-gas power generation based on a predefined map as in FIG. 5. Alternatively, the control unit 12 may determine that the power is not generated by the exhaust-gas power generation when a knock sensor (corresponding to an abnormal-combustion detecting section; not shown in FIG. 1) provided in the engine 1 determines the occurrence of an abnormality.

In the manner described above, when the control unit 12 determines in Step S204 that the exhaust-gas power generation is allowed (specifically, determines based on current parameter values that the operation is not currently performed in the exhaust-gas power generation inhibited range), the processing proceeds to Step S206 in which the motor generator 16 is driven by the power generated by the exhaust-gas power generation.

Further, in Step S209, the control unit 12 corrects the engine output which is reduced by the pressure drop generated by the exhaust-gas power generation. Then, the processing series is terminated. In this state, the engine output is assisted by the motor generator 16 by using the exhaust-gas energy which is otherwise discarded. Therefore, a total efficiency as the vehicle is the highest in this state. Specifically, when the power is generated by the exhaust-gas driven generator 11 after the control unit 12 determines that the inhibited state is cancelled, the control unit 12 can control the amount of power generated by the exhaust-gas power generation so that a fuel consumption rate with respect to the output of the engine becomes the smallest.

On the other hand, when the control unit 12 determines to inhibit the exhaust-gas power generation in Step S204 (specifically, it is determined based on the current parameter values that the operation is currently performed in the exhaust-gas power generation inhibited range), the motor generator 16 is to be driven by the power from the battery 14. However, if a power storage amount SOC of the battery 14 is low, the motor generator 16 cannot be driven. Therefore, in Step S205, the control unit 12 determines whether or not the power storage amount SOC is larger than a predetermined threshold value.

When the control unit 12 determines that the power storage amount SOC is larger than the predetermined threshold value, the processing proceeds to Step S207 in which the motor generator 16 is driven by the power from the battery 14. Then, the processing series is terminated. On the other hand, when the control unit 12 determines that the power storage amount SOC is equal to or smaller than the predetermined threshold value, the processing proceeds to Step S208 in which the vehicle is controlled to run only by the engine without the assist by the motor generator 16. Then, the processing series is terminated.

The state without the assist in Step S208 is brought about because the assist cannot be provided depending on the conditions of the battery although the assist by the motor generator 16 is intrinsically required. In this case, a display and an announcement may be made to notify the driver that a desired output cannot be obtained.

Figure 6:
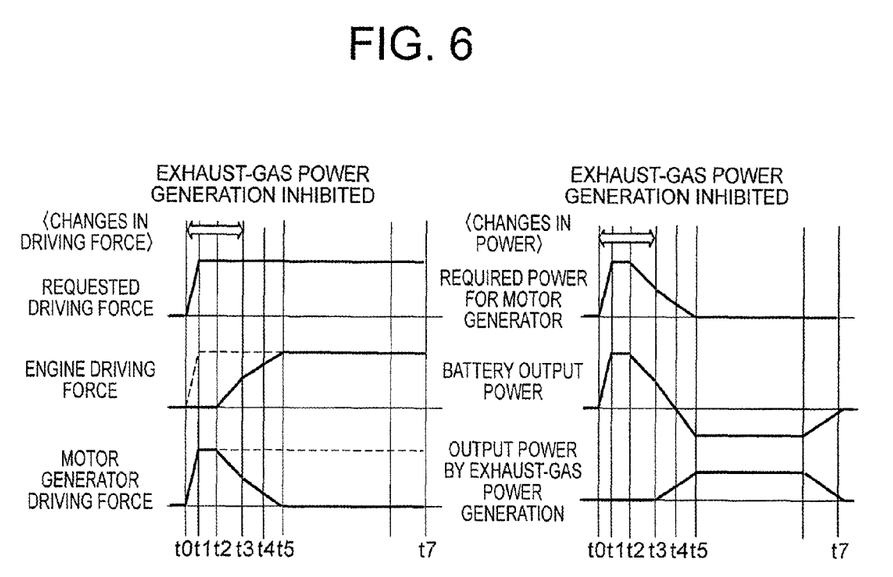
FIG. 6 is an explanatory graph showing an operation performed in the control device for a hybrid vehicle including an exhaust-gas driven generator according to the first embodiment of the present invention when it is determined to inhibit the exhaust-gas power generation at the time of acceleration.
Figure 7:
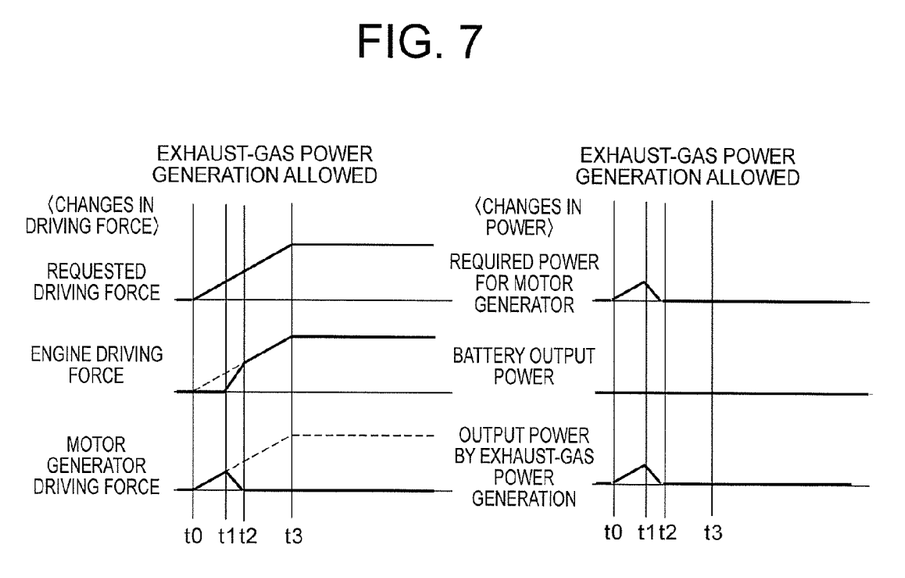
FIG. 7 is an explanatory graph showing an operation performed in the control device for a hybrid vehicle including an exhaust-gas driven generator according to the first embodiment of the present invention when it is determined to allow the exhaust-gas power generation at the time of acceleration.

Next, the effects obtained by the operation in accordance with the flowchart of FIG. 2 are described referring to FIGS. 6 and 7. FIG. 6 is an explanatory graph showing an operation of the control device for a hybrid vehicle including an exhaust-gas driven generator according to the first embodiment of the present invention when it is determined to inhibit the exhaust-gas power generation at the time of acceleration. FIG. 7 is an explanatory graph showing an operation of the control device for a hybrid vehicle including an exhaust-gas driven generator according to the first embodiment of the present invention when it is determined to allow the exhaust-gas power generation at the time of acceleration.

For changes in driving force on the left of FIG. 6 showing the case where it is determined to inhibit the exhaust-gas power generation, a requested driving force is calculated at a time t0 based on the operation of the accelerator pedal by the driver. At the same time, for the large requested driving force, it is determined to inhibit the exhaust-gas power generation. Therefore, at a time t1, the requested driving force is achieved by a driving force of the motor generator 16.

The engine 1 is characterized in large reaction delay and response delay. The engine rpm starts increasing at a time t2 with a reaction delay and a response delay (specifically, with a large gradient of the driving force). At a time t3, the determination of the inhibition of the exhaust-gas power generation is cancelled to start the exhaust-gas power generation. At a time t5, the requested driving force can be achieved by the driving force of the engine 1.

For changes in power on the right of FIG. 6 corresponding to the changes in driving force described above, required power for the motor generator 16 can be calculated by multiplying the driving force of the motor generator 16 by a power-generation efficiency. From the time t0 to the time t3, the motor generator 16 is driven by the power of the battery 14 because of the determination of the inhibition of the exhaust-gas power generation. After the time t3, the power can be generated by the exhaust-gas power generation. Therefore, the driving of the motor generator 16 is assisted by the exhaust-gas power generation in addition to the power from the battery 14. After a time t4, the battery is charged while the motor generator 16 is continuously driven by the power generated by the exhaust-gas power generation.

After the time t5, the power for driving the motor generator 16 is not required anymore. Therefore, the battery 14 is charged with the power generated by the exhaust-gas power generation. The battery 14 is charged until a time t7 at which the amount of power equal to a battery capacity which is used from the time t0 to the time t4 can be recovered.

On the other hand, for changes in driving force on the left of FIG. 7 showing the case where it is determined to allow the exhaust-gas power generation, the requested driving force is first calculated at the time t0 based on the operation of the accelerator pedal by the driver. At the same time, for a small requested driving force, it is determined to allow the exhaust-gas power generation. Therefore, until the time t1, the requested driving force is achieved only by the driving force of the motor generator 16.

Then, the engine rpm starts increasing at the time t1 with a response delay. Then, until the time t2 at which the driving force of the engine reaches the requested driving force, the motor generator 16 assists the output. After the time t2, the requested driving force is achieved by the engine alone.

For changes in power on the right of FIG. 7 corresponding to the changes in driving force, required power for the motor generator 16 can be calculated by multiplying the driving force of the motor generator 16 by the power generation efficiency as in the case of FIG. 6. Here, the exhaust-gas power generation is allowed. Therefore, all the driving power for the motor generator 16 between the time t0 and the time t2 is supplied by the exhaust-gas power generation. Therefore, a battery-power input/output does not occur.

As described above, according to the control device and the method of controlling a hybrid vehicle including an exhaust-gas power generator according to the first embodiment, it is possible to simultaneously realize the acceleration requested by the driver while preventing the occurrence of the abnormality in the engine and realize a high fuel efficiency by regenerating the exhaust-gas energy by the exhaust-gas power generation.

In the hybrid vehicle illustrated in FIG. 1, it is common to mount a DC/DC converter (not shown) in the battery 14. The DC/DC converter is provided to lower a high voltage of the battery 14 to 12/14V which is used in existing general vehicles so as to supply the power to in-vehicle electric components. The detailed description thereof is herein omitted.

In the first embodiment, when it is determined to inhibit the exhaust-gas power generation, the output of the DC/DC converter may be stopped until a sum output of the engine output and the output of the motor generator 16 becomes equal to the requested driving force by the driver. As a result, power used for the DC/DC converter can be eliminated from the amount of power used from the battery 14, and the power is used only for the motor generator 16. Therefore, a response to the requested driving force can be further improved.

Further, in the first embodiment, the output may be limited in accordance with a temperature of the exhaust-gas driven generator. Specifically, it is considered to detect a temperature of an electric motor for an exhaust-gas driven generator for driving the exhaust-gas driven generator, or an exhaust-gas generator controller for driving the electric motor for the exhaust-gas driven generator to limit the output. By limiting the output in the manner described above, the exhaust-gas driven generator can be protected from excessive overheat.

Further, in the first embodiment, the output may be limited in accordance with a temperature of the motor generator. Specifically, it is considered to detect a temperature of the motor generator or a MG control device for driving the motor generator to limit the output. By limiting the output in the manner described above, the motor generator and the MG control device for driving the motor generator can be protected from excessive overheat.

Although the hybrid system including the two clutches which sandwich the motor generator has been described as an example in the first embodiment, the present invention is not limited to the first embodiment. The present invention can be applicable to all known hybrid systems as long as the hybrid systems include a motor which can perform driving and regeneration with respect to the engine output such as a belt-driven motor generator.

Further, a lithium-ion battery is generally used as the battery 14. However, a nickel-hydride battery or a high-voltage capacitor can also be used as the battery 14. The present invention is applicable to all power-supply systems as long as a battery is 36 V or higher.

What is claimed is:

1. A control device for a hybrid vehicle including an exhaust-gas driven generator, the hybrid vehicle comprising:
   a turbine provided in an exhaust passage of an internal combustion engine;
   an exhaust-gas driven generator for generating power by being driven by the turbine;
   a motor generator for one of assisting an output of the internal combustion engine and generating power by using the output of the internal combustion engine;
   a battery for storing the power generated by the exhaust-gas driven generator and the power generated by the motor generator; and
   a control unit for reading at least one of an operation amount of an accelerator pedal, a vehicle speed, and an engine rpm as a status signal to perform overall control on the exhaust-gas driven generator, the motor generator, and the battery based on a result of reading of the status signal, wherein:
   when determining based on the result of the reading of the status signal that the output of the internal combustion engine is required to be assisted by the motor generator, the control unit further determines whether the power generation by the exhaust-gas driven generator is in an inhibited state or an allowed state; and
   when determining that the power generation by the exhaust-gas driven generator is in the inhibited state, the control unit stops the power generation by the exhaust-gas driven generator to drive the motor generator by the power from the battery.

2. A control device for a hybrid vehicle including an exhaust-gas driven generator according to claim 1, wherein the control unit computes a torque command from the operation amount of the accelerator pedal and the vehicle speed based on the result of the reading of the status signal, computes exhaust-gas energy from the torque command and the engine rpm, and determines whether the power generation by the exhaust-gas driven generator is in the inhibited state or the allowed state from a relationship between a change amount in the torque command and the exhaust-gas energy.

3. A control device for a hybrid vehicle including an exhaust-gas driven generator according to claim 1, further comprising an abnormal-combustion detecting section for detecting an abnormal combustion state of the internal combustion engine,
   wherein, when the abnormal combustion state is detected by the abnormal-combustion detecting section, the control unit determines that the power generation by the exhaust-gas driven generator is in the inhibited state.

4. A control device for a hybrid vehicle including an exhaust-gas driven generator according to claim 1, wherein the control unit performs control to generate the power by the exhaust-gas driven generator after the inhibited state is cancelled and to charge the battery with an amount of power corresponding to an amount supplied from the battery while the power generation by the exhaust-gas driven generator is in the inhibited state.

5. A control device for a hybrid vehicle including an exhaust-gas driven generator according to claim 1, wherein the control unit controls a power generation amount by the exhaust-gas power generation so that a fuel consumption rate becomes the smallest with respect to the output of the internal combustion engine when the power is generated by the exhaust-gas driven generator after it is determined that the inhibited state is cancelled.

6. A control device for a hybrid vehicle including an exhaust-gas driven generator according to claim 1, further comprising a power-storage-amount detecting section for detecting a power storage amount of the battery, wherein:
   the control unit performs the overall control to drive the motor generator by the power from the battery when determining that the power storage amount of the battery, detected by the power-storage-amount detecting section, is larger than a predetermined threshold value and to control the vehicle to run only by the engine without the assist by the motor generator when determining that the power storage amount of the battery is equal to or smaller than the predetermined threshold value.

7. A control device for a hybrid vehicle including an exhaust-gas driven generator according to claim 1, wherein:
   the battery comprises a DC/DC converter for outputting stored power after lowering a voltage of the stored power; and
   the control unit stops an output of the DC/DC converter when determining that the power generation by the exhaust-gas driven generator is in the inhibited state.

8. A control device for a hybrid vehicle including an exhaust-gas driven generator according to claim 1, further comprising an exhaust-gas driven generator temperature detecting section for detecting at least one of a temperature of an electric motor for driving the exhaust-gas driven generator and a temperature of an inverter for driving the electric motor,
   wherein the control unit limits an output of the exhaust-gas driven generator in accordance with a result of detection by the exhaust-gas driven generator temperature detecting section.

9. A method of controlling a hybrid vehicle including an exhaust-gas driven generator,
   the hybrid vehicle comprising:
   a turbine provided in an exhaust passage of an internal combustion engine;
   an exhaust-gas driven generator for generating power by being driven by the turbine;
   a motor generator for one of assisting an output of the internal combustion engine and generating power by using the output of the internal combustion engine;

a battery for storing the power generated by the exhaust-gas driven generator and the power generated by the motor generator; and a control unit for reading at least one of an operation amount of an accelerator pedal, a vehicle speed, and an engine rpm as a status signal to perform overall control on the exhaust-gas driven generator, the motor generator, and the battery based on a result of the reading of the status signal, the control method comprising:

a first step of determining whether or not to assist the output of the internal combustion engine by the motor generator based on a result of the reading of the status signal;

a second step of determining whether power generation by the exhaust-gas driven generator is in an inhibited state or an allowed state when the control unit determines that the output of the internal combustion engine is required to be assisted by the motor generator in the first step; and a third step of stopping the power generation by the exhaust-gas driven generator and driving the motor generator by the power from the battery when the control unit determines that the power generation by the exhaust-gas driven generator is in the inhibited state in the second step.

* * * * *